US012732335B2

(12) United States Patent
Leng

(10) Patent No.: US 12,732,335 B2
(45) Date of Patent: Sep. 8, 2026

(54) METHOD FOR ADJUSTING SERIAL NUMBER LENGTH AND BASE STATION

(71) Applicant: Nanning FuLian FuGui Precision Industrial Co., Ltd., Nanning (CN)

(72) Inventor: Cheng-Chao Leng, Shenzhen (CN)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 355 days.

(21) Appl. No.: 18/398,537

(22) Filed: Dec. 28, 2023

(65) Prior Publication Data

US 2024/0388412 A1 Nov. 21, 2024

(30) Foreign Application Priority Data

May 16, 2023 (CN) ......................... 202310551951.7

(51) Int. Cl.
*H04L 5/00* (2006.01)
*H04W 72/1268* (2023.01)

(52) U.S. Cl.
CPC .......... *H04L 5/0096* (2013.01); *H04L 5/0055* (2013.01); *H04W 72/1268* (2013.01)

(58) Field of Classification Search
CPC ... H04L 5/0096; H04L 5/0055; H04L 1/1642; H04L 1/1825; H04L 1/1832; H04L 1/187; H04W 72/1268; H04W 28/02; H04W 72/21
See application file for complete search history.

(56) References Cited

U.S. PATENT DOCUMENTS

| | | | | |
|---|---|---|---|---|
| 7,729,719 | B2 * | 6/2010 | Bergstrom | H04L 1/187 455/67.11 |
| 8,498,284 | B2 * | 7/2013 | Pani | H04W 28/0252 370/464 |
| 2015/0304061 | A1 * | 10/2015 | Gupta | H04L 1/187 370/328 |
| 2018/0115491 | A1 * | 4/2018 | Jonsson | H04L 47/34 |
| 2022/0124865 | A1 | 4/2022 | Kanamarlapudi et al. | |

FOREIGN PATENT DOCUMENTS

| | | | |
|---|---|---|---|
| CN | 103716260 | A | 4/2014 |
| CN | 114503631 | A | 5/2022 |

* cited by examiner

*Primary Examiner* — Gary Mui
*Assistant Examiner* — Yewon Kim
(74) *Attorney, Agent, or Firm* — ScienBiziP, P.C.

(57) ABSTRACT

In a method for adjusting serial number length, a base station and a computer-readable storage medium, parameters of a transmission window and parameters of a reception window of a user equipment in a confirmation mode of a radio link control (RLC) protocol are acquired; and serial number length of a downlink is adjusted according to the parameters of the transmission window and serial number length of an uplink is adjusted according to the parameters of the reception window.

9 Claims, 2 Drawing Sheets

METHOD FOR ADJUSTING SERIAL NUMBER LENGTH AND BASE STATION

CROSS-REFERENCE TO RELATED APPLICATIONS

This application claims priority to Chinese Patent Application No. 202310551951.7 filed on May 16, 2023, in China National Intellectual Property Administration, the contents of which are incorporated by reference herein.

FIELD

The subject matter herein generally relates to serial number length adjustment technology, in particular to a method for adjusting serial number length and a base station.

BACKGROUND

The serial number (SN) is designed by the 3rd Generation Partnership Project (3GPP) to identify the serial number of the data packet, in which the serial number length (Sn-FieldLength) of the Radio Link Control (RLC) is a very important parameter of the Long Term Evolution (LTE) and New Radio (NR) RLC protocol. Especially in the RLC confirmation mode (Acknowledged Mode, AM mode), SN involves the RLC layer data packet Sn-FieldLength also directly determines the size of the queue window for retransmission, reorganization, reordering, etc.

The RLC Sn-FieldLength defined by 3GPP has 6 bit (SN: 26=64), 12 bit (SN: 4096), and 18 bit (SN: 262144). The protocol stipulates that the RLC retransmission, reassembly, and reordering queue windows are half the length of Sn-FieldLength (SN-FieldLength/2). When the user equipment (UE) has a large throughput (rate) and uses a small Sn-FieldLength, it may occur that the transmission or reception window is full and waits for RLC retransmission or RLC poll, thus affecting the RLC layer data Processing Rate and Latency. When the UE throughput (rate) is small and a large Sn-FieldLength is used, it will increase the system memory overhead and affect the system capacity; therefore, an appropriate RLC AM Sn-FieldLength is very important to the RLC layer.

BRIEF DESCRIPTION OF THE DRAWINGS

Implementations of the present technology will now be described, by way of example only, with reference to the attached figures, wherein.

DETAILED DESCRIPTION

Figure 1:
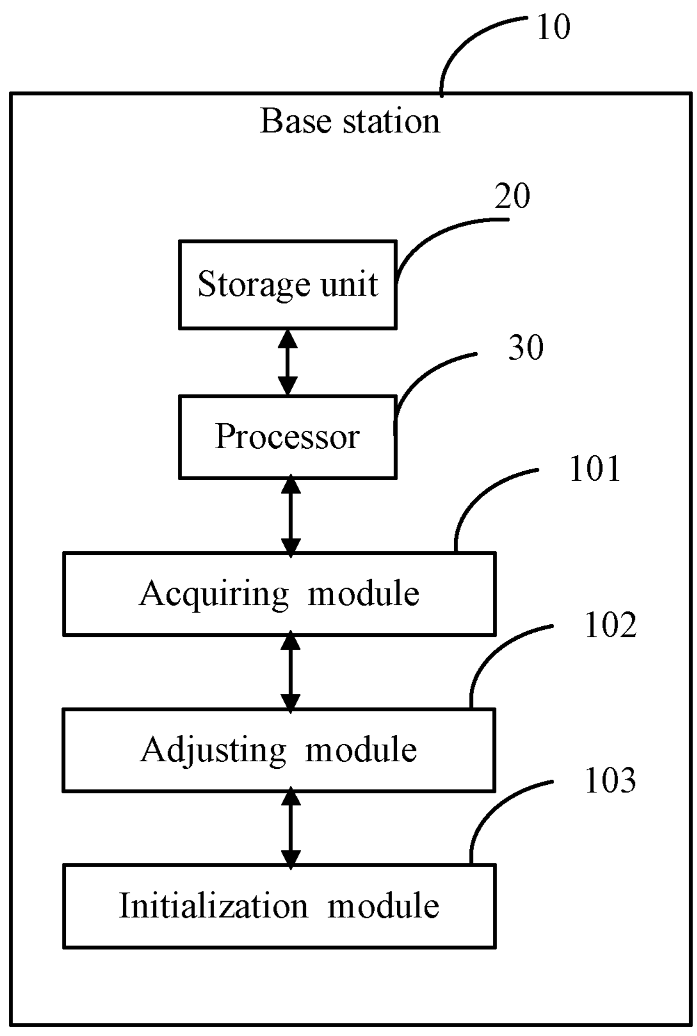
FIG. 1 is a program module diagram illustrating a base station according to a preferred embodiment of the present disclose.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 illustrates a program module diagram of a base station 10 according to a preferred embodiment of the present disclose.

The base station 10 includes an acquiring module 101, an adjusting module 102, and an initialization module 103. The management system 10 further includes a storage unit 20, and a processor 30. The modules are configured to be executed by one or more processors (in the in the preferred embodiment, a number of the one or more processors 30 is one). The modules referred to are computer program segments that perform specific instructions. The storage unit 20 is used to store program code and other data of the management system for a shared radio unit 10. The processor 30 is used to execute the program code stored in the storage unit 20.

The storage unit 20 includes at least one type of readable storage medium, the readable storage medium includes a flash memory, a hard disk, a multimedia card, a card-type memory (for example, SD or DX memory, etc.), a random access memory (RAM), a static random access memory (SRAM), a read only memory (ROM), an electrically erasable programmable read only memory (EEPROM), a programmable read only memory (PROM), a magnetic memory, a magnetic disk, an optical disk, and other components. The processor 30 may be a central processing unit (CPU), a controller, a microcontroller, a microprocessor, or other data processing chip.

The acquiring module 101 acquires parameters of a transmission window and parameters of a reception window of a user equipment in a confirmation mode of a radio link control (RLC) protocol.

In a Wideband Code Division Multiple Access (WCDMA) system, the radio link control protocol (RLC) layer is located above the media access control address protocol (MAC) layer and is a part of L2, and provides segmentation and retransmission services for user and control data. RLC includes acknowledged mode (AM mode), unacknowledged mode (UM mode) and transparent mode (TM mode). In RLC, AM is used for data services, TM is used for voice services, and UM is mainly used for some signaling bearers. In the embodiment, the serial number length (SN-FieldLength) of uplink and downlink is mainly adjusted in the AM mode. SN-FieldLength is used to manage the length of the packet serial number at the RLC layer, and this serial number plays a key role in determining whether the RLC transmission/retransmission is correct or not.

The adjusting module 102 adjusts serial number length of downlink according to the parameters of the transmission window and adjusts serial number length of uplink according to the parameters of the reception window.

In the uplink, the adjusting module 102 acquires a maximum serial number RX_NEXT_Highest received by the base station, next serial number RX_NEXT which is expected to be received by the base station, and a size of the current transmission window AM_window_Size, then performs remainder operation on (RX_NEXT_Highest−RX_NEXT+AM_window_Size) and AM_window_Size to get a second value. The adjusting module 102 compares the second value with a first preset threshold (for example, the first preset threshold is K/8*AM_window_Size), and when the second value is greater than the first preset threshold, the adjusting module 102 starts a timer for a preset time (for example, the preset time is set to 100 ms). Within the preset time when the timer starts, whenever the first value is less than a second preset threshold (for example, the second preset threshold is K/4*AM_window_Size), the adjusting module 102 increases a count of a first counter, and whenever the first value is not less than a third preset threshold (for example, the third preset threshold is K*AM_window_Size), the adjusting module 102 increases a count of a second counter.

The size of the current transmission window is obtained by the formula AM_window_Size=$2^{SN\text{-}FieldLength-1}$.

When the preset time for which the timer starts is over, when a value of the first counter is not less than a first count threshold, and the serial number length is not a minimum value allowed by the serial number length, the adjusting module 102 decreases a value of the serial number length. The first count threshold is set to 5 times as required.

When a value of the second counter is not less than a second count threshold and the serial number length is not a maximum value allowed by the serial number length, the adjusting module 102 increases the value of the serial number length. The second count threshold can also be set to 5 times as required, can also be set to other values according to the needs, and the first count threshold and the second count threshold can be the same or different.

The RLC Sn-FieldLength defined by 3GPP has 6 bit (Sn: 26=64), 12 bit (Sn: 4096), and 18 bit (Sn: 262144). Therefore, when the value of the first counter is not less than the first threshold value and the serial number length is not the minimum value of 6 bits allowed by the serial number length, the value of the serial number length is reduced. For example, 18 bit can be reduced to 6 bit or 12 bit, and 12 bit can be reduced to 6 bit. When the value of the second counter is not less than the second count threshold and the serial number length is not a maximum value of 18 bits allowed by the serial number length, the value of the serial number length is increased. For example, 6 bit can be increased to 12 bit or 18 bit, and 12 bit can be increased to 18 bit.

The initialization module 103 resets the count of the first counter and the count of the second counter to zero after a value adjustment of the serial number length of the downlink and the serial number length of the uplink is completed.

For example, the functions of the adjusting module 102 and the initialization module 103 can be realized by the following codes:

```
        If DL RLC SDU received form PDCP:
    If (Tx__next − Tx__next__ACK + AM__window__Size)mod(AM__window__Size)> K/8*
AM__window__Size
              Start adjust__timer;
          endif
    If (Tx__next − Tx__next__ACK + AM__window__Size)mod(AM__window__Size) < K/4*
AM__window__Size:
    low__count++;
    elseif (Tx__next − Tx__next__ACK + AM__window__Size) mod (AM__window__Size) >=
K* AM__window__Size:
    high__count++;
    endif
    endif
    if adjust__timer time__out:
    if low__count >= count__adjust && Sn__FiledLength is not the min Sn__FieldLength
    trigger Sn__FiledLength decline;
          endif
          if high__count >= count__adjust && Sn__FiledLength is not the max
Sn__FieldLength
            trigger Sn__FieldLength rise;
          endif
        low__count = 0;
        high__count = 0;
      endif.
```

In the above code, K represents an utilization threshold of the transmission window, such as 80%, when the window utilization reaches 80%, the counter is raised, and when the current usage is lower than K/4, that is, 20%, the counter is lowered.

The adjust_timer is a timer adjusted for Sn-FieldLength, and the timer is started when the window utilization is greater than a certain value, such as 10%. count_adjust is a statistical times threshold. K, K/4, K/8 can be configured according to the actual situation.

In the uplink, the adjusting module 102 acquires a maximum serial number RX_NEXT_Highest received by the base station, next serial number RX_NEXT which is expected to be received by the base station, and a size of the current transmission window AM_window_Size, then performs remainder operation on (RX_NEXT_Highest−RX_NEXT+AM_window_Size) and AM_window_Size to get a second value. The adjusting module 102 compares the second value with a first preset threshold (for example, the first preset threshold is K/8*AM_window_Size), and when the second value is greater than the first preset threshold, the adjusting module 102 starts a timer for a preset time (for example, the preset time is set to 100 ms). Within the preset time when the timer starts, whenever the first value is less than a second preset threshold (for example, the second preset threshold is K/4*AM_window_Size), the adjusting module 102 increases a count of a first counter, and whenever the first value is not less than a third preset threshold (for example, the third preset threshold is K*AM_window_Size), the adjusting module 102 increases a count of a second counter.

The size of the current transmission window is obtained by the formula AM_window_Size=$2^{SN\text{-}FieldLength-1}$.

When the preset time for which the timer starts is over, when a value of the first counter is not less than a first count threshold, and the serial number length is not a minimum value allowed by the serial number length, the adjusting module 102 decreases a value of the serial number length. The first count threshold is set to 5 times as required.

When a value of the second counter is not less than a second count threshold and the serial number length is not a maximum value allowed by the serial number length, the adjusting module 102 increases the value of the serial number length. The second count threshold can also be set to 5 times as required, can also be set to other values according to the needs, and the first count threshold and the second count threshold can be the same or different.

For example, the functions of the adjusting module 102 and the initialization module 103 can be realized by the following codes:

```
    If DL RLC SDU received form PDCP:
  If (Tx_next - Tx_next_ACK + AM_window_Size) mod (AM_window_Size)> K/8*
AM_window_Size
                Start adjust_timer;
          endif
  If (Tx_next - Tx_next_ACK + AM_window_Size)mod(AM_window_Size) < K/4*
AM_Window_Size:
  low_count++;
  elseif (Tx_next - Tx_next_ACK + AM_window_Size)mod (AM_window_Size) >=
K* AM_window_Size:
  high_count++;
  endif
  endif
  if adjust_timer time_out:
  if low_count >= count_adjust && sn_FiledLength is not the min sn_FieldLength
  trigger Sn_FiledLength decline;
      endif
      if high_count >= count_adjust &&Sn_FiledLength is not the max
Sn_FieldLength
            trigger Sn_FieldLength rise;
      endif
    low_count = 0;
    high_count = 0;
  endif.
```

In a WCDMA system, the radio link control protocol (RLC) layer is located above the media access control address protocol (MAC) layer and is a part of L2, and provides segmentation and retransmission services for user and control data. RLC includes acknowledged mode (AM mode), unacknowledged mode (UM mode) and transparent mode (TM mode). In RLC, AM is used for data services, TM is used for voice services, and UM is mainly used for some signaling bearers. In the embodiment, the serial number length (SN-FieldLength) of uplink and downlink is mainly adjusted in the AM mode. SN-FieldLength is used to manage the length of the packet serial number at the RLC layer, and this serial number plays a key role in determining whether the RLC transmission/retransmission is correct or not.

At block 202, serial number length of downlink is adjusted according to the parameters of the transmission window and serial number length of uplink is adjusted according to the parameters of the reception window.

In the uplink, a maximum serial number RX_NEXT_Highest received by the base station, next serial number RX_NEXT which is expected to be received by the base station, and a size of the current transmission window AM_window_Size are acquired, then remainder operation on (RX_NEXT_Highest−RX_NEXT+AM_window_Size) and AM_window_Size is performed to get a second value. The second value is compared with a first preset threshold (for example, the first preset threshold is K/8*AM_window_Size), and when the second value is greater than the first preset threshold, a timer is started for a preset time (for example, the preset time is set to 100 ms). Within the preset time when the timer starts, whenever the first value is less than a second preset threshold (for example, the second preset threshold is K/4*AM_window_Size), a count of a first counter is increased, and whenever the first value is not less than a third preset threshold (for example, the third preset threshold is K*AM_window_Size), a count of a second counter is increased.

The size of the current transmission window is obtained by the formula AM_window_Size=$2^{SN\text{-}FieldLength-1}$.

Figure 2:
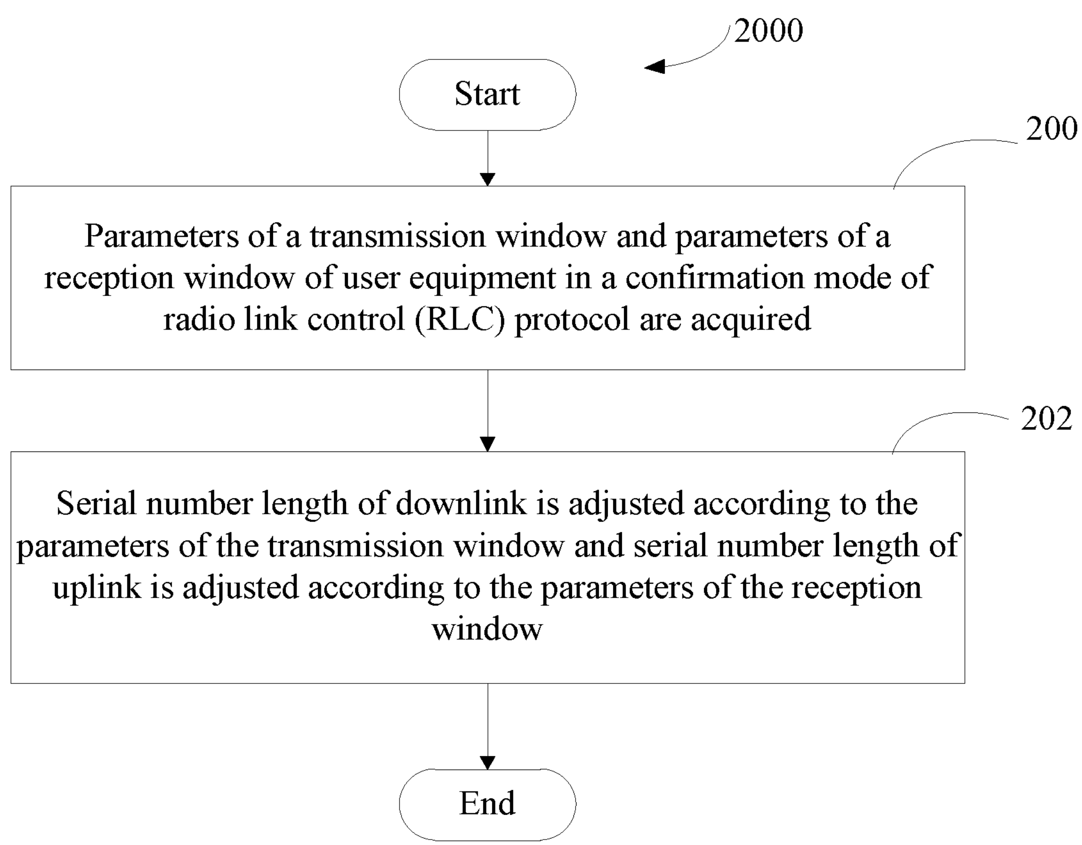
FIG. 2 is a flowchart illustrating a method for adjusting serial number length according to a preferred embodiment of the present disclose.

When the preset time for which the timer starts is over, when a value of the first counter is not less than a first count threshold, and the serial number length is not a minimum FIG. 2 illustrates a flowchart presented in accordance with an embodiment of a method for adjusting serial number length 2000. Each block shown in FIG. 2 represents one or more processes, methods, or subroutines, carried out in the exemplary method 2000. Additionally, the illustrated order of blocks is by example only and the order of the blocks can be changed. The method 2000 can begin at block 200.

At block 200, parameters of a transmission window and parameters of a reception window of user equipment in a confirmation mode of radio link control (RLC) protocol are acquired.

value allowed by the serial number length, a value of the serial number length is decreased. The first count threshold is set to 5 times as required.

When a value of the second counter is not less than a second count threshold and the serial number length is not a maximum value allowed by the serial number length, the value of the serial number length is increased. The second count threshold can also be set to 5 times as required, can also be set to other values according to the needs, and the first count threshold and the second count threshold can be the same or different.

The RLC Sn-FieldLength defined by 3GPP has 6 bit (Sn: $2^6$=64), 12 bit (Sn: 4096), and 18 bit (Sn: 262144). Therefore, when the value of the first counter is not less than the first threshold value and the serial number length is not the minimum value of 6 bits allowed by the serial number length, the value of the serial number length is reduced. For example, 18 bit can be reduced to 6 bit or 12 bit, and 12 bit can be reduced to 6 bit. When the value of the second counter is not less than the second count threshold and the serial number length is not a maximum value of 18 bits allowed by the serial number length, the value of the serial number length is increased. For example, 6 bit can be increased to 12 bit or 18 bit, and 12 bit can be increased to 18 bit.

The count of the first counter and the count of the second counter are reset to zero after the value adjustment of the serial number length of the downlink and the serial number length of the uplink is completed.

For example, the above functions can be realized by the following codes:

In the uplink, a maximum serial number RX_NEXT_Highest received by the base station, next serial number RX_NEXT which is expected to be received by the base station, and a size of the current transmission window AM_window_Size are acquired, then remainder operation on (RX_NEXT_Highest−RX_NEXT+AM_window_Size) and AM_window_Size is performed to get a second value. The second value is compared with a first preset threshold (for example, the first preset threshold is K/8*AM_window_Size), and when the second value is greater than the first preset threshold, a timer is started for a preset time (for example, the preset time is set to 100 ms). Within the preset time when the timer starts, whenever the first value is less than a second preset threshold (for example, the second preset threshold is K/4*AM_window_Size), a count of a first counter is increased, and whenever the first value is not less than a third preset threshold (for example, the third preset threshold is K*AM_window_Size), a count of a second counter is increased.

The size of the current transmission window is obtained by the formula AM_window_Size=$2^{SN\text{-}FieldLength-1}$.

When the preset time for which the timer starts is over, when a value of the first counter is not less than a first count threshold, and the serial number length is not a minimum value allowed by the serial number length, a value of the serial number length is decreased. The first count threshold is set to 5 times as required.

```
    If DL RLC SDU received form PDCP:
  If (Tx_next − Tx_next_ACK + AM_window_Size) mod (AM_window_Size) > K/8*
AM_window_Size
              Start adjust_timer;
        endif
  If (Tx_next − Tx_next_ACK + AM_window_Size) mod (AM_window_Size) < K/4*
AM_window_Size:
  low_count++;
  elseif (Tx_next − Tx_next_ACK + AM_window_Size) mod (AM_window_Size) >=
K* AM_window_Size:
  high_count++;
  endif
  endif
  if adjust_timer time_out:
  if low_count >= count_adjust && Sn_FiledLength is not the min Sn_FieldLength
  trigger Sn_FiledLength decline;
       endif
       if high_count >= count_adjust && Sn_FiledLength is not the max
sn_FieldLength
           trigger Sn_FieldLength rise;
        endif
    low_count = 0;
    high_count = 0;
  endif.
```

In the above code, K represents an utilization threshold of the transmission window, such as 80%, when the window utilization reaches 80%, the counter is raised, and when the current usage is lower than ¼ K, that is, 20%, the counter is lowered.

adjust_timer is a timer adjusted for Sn-FieldLength, and the timer is started when the window utilization is greater than a certain value, such as 10%. count_adjust is a statistical times threshold. K, K/4, K/8 can be configured according to the actual situation.

When a value of the second counter is not less than a second count threshold and the serial number length is not a maximum value allowed by the serial number length, the value of the serial number length is increased. The second count threshold can also be set to 5 times as required, can also be set to other values according to the needs, and the first count threshold and the second count threshold can be the same or different.

For example, the above functions can be realized by the following codes:

```
    If DL RLC SDU received form PDCP:
  If (Tx_next − Tx_next_ACK + AM_window_Size) mod (AM_window_Size)>
K/8*AM_window_Size
        Start adjust_timer;
    endif
  If (Tx_next − Tx_next_ACK + AM_window_Size) mod (AM_window_Size) < K/4*
AM_window_Size:
  low_count++;
  elseif (Tx_next − Tx_next_ACK + AM_window_Size) mod (AM_window_Size) >=
K* AM_window_Size:
  high_count++;
  endif
  endif
  if adjust_timer time_out:
  if low_count >= count_adjust && Sn_FiledLength is not the min Sn_FieldLength
  trigger Sn_FiledLength decline;
    endif
    if high_count >= count_adjust && Sn_FiledLength is not the max
Sn_FieldLength
      trigger Sn_FieldLength rise;
    endif
   low_count = 0;
   high_count = 0;
  endif.
```

The embodiments shown and described above are only examples. Many details are often found in the art such as the other features of method for adjusting serial number length. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for adjusting serial number length, applied to a base station, the method comprising:

acquiring parameters of a transmission window and parameters of a reception window of a user equipment in a confirmation mode of a radio link control (RLC) protocol; and adjusting serial number length of a downlink according to the parameters of the transmission window and adjusting serial number length of an uplink according to the parameters of the reception window;

wherein adjusting the serial number length of the downlink according to the parameters of the transmission window further comprises:

in the downlink, acquiring next serial number Tx_next to be sent by the base station, a next serial number Tx_next_ACK which is expected to be received by the user equipment, and a size of the transmission window AM_window_Size;

performing a remainder operation on (Tx_next−Tx_next_ACK+AM_window_Size) and AM_window_Size to get a first value;

comparing the first value with a first preset threshold;

starting a timer for a preset time when the first value is greater than the first preset threshold;

increasing a count of a first counter within the preset time when the timer starts whenever the first value is less than a second preset threshold, and increasing a count of a second counter within the preset time whenever the first value is not less than a third preset threshold;

decreasing a value of the serial number length of the downlink when the preset time for which the timer starts is over, a value of the first counter is not less than a first count threshold, and the serial number length of the downlink is not a minimum value allowed by the serial number length of the downlink; and increasing the value of the serial number length of the downlink when a value of the second counter is not less than a second count threshold and the serial number length of the downlink is not a maximum value allowed by the serial number length of the downlink.

2. The method for adjusting serial number length according to claim 1, wherein adjusting the sequence number length of the uplink according to the parameters of the reception window further comprises:

in the uplink, acquiring a maximum serial number RX_NEXT_Highest received by the base station, a next serial number RX_NEXT which is expected to be received by the base station, and a size of the current transmission window AM_window_Size;

performing remainder operation on (RX_NEXT_Highest-RX_NEXT+AM_window_Size) and AM_window_Size to get a second value;

comparing the second value with a first preset threshold;

starting a timer for a preset time when the second value is greater than the first preset threshold;

increasing a count of a first counter within the preset time when the timer starts, whenever the first value is less than a second preset threshold, and increasing a count of a second counter within the preset time when the timer starts whenever the first value is not less than a third preset threshold;

decreasing a value of the serial number length of the uplink when the preset time for which the timer starts is over, a value of the first counter is not less than a first count threshold, and the serial number length of the uplink is not a minimum value allowed by the serial number length of the uplink; and increasing the value of the serial number length of the uplink when a value of the second counter is not less than a second count threshold and the serial number length of the uplink is not a maximum value allowed by the serial number length of the uplink.

3. The method for adjusting serial number length according to claim 1, further comprising:

resetting the count of the first counter and the count of the second counter to zero after a value adjustment of the serial number length of the downlink and the serial number length of the uplink is completed.

4. A base station, which includes a memory, a processor, and a serial number length adjustment program stored in the memory and operable on the processor, wherein the serial number length adjustment program is executed by the processor to implement following functions:

acquiring parameters of a transmission window and parameters of a reception window of a user equipment in a confirmation mode of a radio link control (RLC) protocol; and adjusting serial number length of a downlink according to the parameters of the transmission window and adjusting serial number length of an uplink according to the parameters of the reception window;

wherein when adjusting the serial number length of the downlink according to the parameters of the transmission window, the serial number length adjustment program is further executed by the processor to implement following functions:

in the downlink, acquiring next serial number Tx_next to be sent by the base station, a next serial number Tx_next_ACK which is expected to be received by the user equipment, and a size of the transmission window AM_window_Size;

performing a remainder operation on (Tx_next-Tx_next_ACK+AM_window_Size) and AM_window_Size to get a first value;

comparing the first value with a first preset threshold;

starting a timer for a preset time when the first value is greater than the first preset threshold;

increasing a count of a first counter within the preset time when the timer starts whenever the first value is less than a second preset threshold, and increasing a count of a second counter within the preset time whenever the first value is not less than a third preset threshold;

decreasing a value of the serial number length of the downlink when the preset time for which the timer starts is over, a value of the first counter is not less than a first count threshold, and the serial number length of the downlink is not a minimum value allowed by the serial number length of the downlink; and increasing the value of the serial number length of the downlink when a value of the second counter is not less than a second count threshold and the serial number length of the downlink is not a maximum value allowed by the serial number length of the downlink.

5. The base station according to claim 4, wherein when adjusting the sequence number length of the uplink according to the parameters of the reception window, the serial number length adjustment program is further executed by the processor to implement following functions:

in the uplink, acquiring a maximum serial number RX_NEXT_Highest received by the base station, a next serial number RX_NEXT which is expected to be received by the base station, and a size of the current transmission window AM_window_Size;

performing remainder operation on (RX_NEXT_Highest-RX_NEXT+AM_window_Size) and AM_window_Size to get a second value;

comparing the second value with a first preset threshold;

starting a timer for a preset time when the second value is greater than the first preset threshold;

increasing a count of a first counter within the preset time when the timer starts, whenever the first value is less than a second preset threshold, and increasing a count of a second counter within the preset time when the timer starts whenever the first value is not less than a third preset threshold;

decreasing a value of the serial number length of the uplink when the preset time for which the timer starts is over, a value of the first counter is not less than a first count threshold, and the serial number length of the uplink is not a minimum value allowed by the serial number length of the uplink; and increasing the value of the serial number length of the uplink when a value of the second counter is not less than a second count threshold and the serial number length of the uplink is not a maximum value allowed by the serial number length of the uplink.

6. The base station according to claim 4, the serial number length adjustment program is further executed by the processor to implement following function:

resetting the count of the first counter and the count of the second counter to zero after a value adjustment of the serial number length of the downlink and the serial number length of the uplink is completed.

7. A non-transitory computer-readable storage medium in which computer programs are stored, and the computer programs are executable by at least one processor to perform a method for adjusting serial number length, applied to a base station, the method comprising:

acquiring parameters of a transmission window and parameters of a reception window of a user equipment in a confirmation mode of a radio link control (RLC) protocol; and adjusting serial number length of a downlink according to the parameters of the transmission window and adjusting serial number length of an uplink according to the parameters of the reception window;

wherein adjusting the serial number length of the downlink according to the parameters of the transmission window further comprises:

in the downlink, acquiring next serial number Tx_next to be sent by the base station, a next serial number Tx_next_ACK which is expected to be received by the user equipment, and a size of the transmission window AM_window_Size;

performing a remainder operation on (Tx_next-Tx_next_ACK+AM_window_Size) and AM_window_Size to get a first value;

comparing the first value with a first preset threshold;

starting a timer for a preset time when the first value is greater than the first preset threshold;

increasing a count of a first counter within the preset time when the timer starts whenever the first value is less than a second preset threshold, and increasing a count of a second counter within the preset time whenever the first value is not less than a third preset threshold;

decreasing a value of the serial number length of the downlink when the preset time for which the timer starts is over, a value of the first counter is not less than a first count threshold, and the serial number length of the downlink is not a minimum value allowed by the serial number length of the downlink; and increasing the value of the serial number length of the downlink when a value of the second counter is not less than a second count threshold and the serial number length of the downlink is not a maximum value allowed by the serial number length of the downlink.

8. The non-transitory computer-readable storage medium according to claim 7, wherein adjusting the sequence number length of the uplink according to the parameters of the reception window further comprises:

in the uplink, acquiring a maximum serial number RX_NEXT_Highest received by the base station, a next serial number RX_NEXT which is expected to be received by the base station, and a size of the current transmission window AM_window_Size;

performing remainder operation on (RX_NEXT_Highest-RX_NEXT+AM_window_Size) and AM_window_Size to get a second value;

comparing the second value with a first preset threshold;

starting a timer for a preset time when the second value is greater than the first preset threshold;

increasing a count of a first counter within the preset time when the timer starts, whenever the first value is less than a second preset threshold, and increasing a count of a second counter within the preset time when the timer starts whenever the first value is not less than a third preset threshold;

decreasing a value of the serial number length of the uplink when the preset time for which the timer starts is over, a value of the first counter is not less than a first count threshold, and the serial number length of the uplink is not a minimum value allowed by the serial number length of the uplink; and increasing the value of the serial number length of the uplink when a value of the second counter is not less than a second count threshold and the serial number length of the uplink is not a maximum value allowed by the serial number length of the uplink.

9. The non-transitory computer-readable storage medium according to claim 7, the method further comprising:

resetting the count of the first counter and the count of the second counter to zero after a value adjustment of the serial number length of the downlink and the serial number length of the uplink is completed.

* * * * *